Aug. 6, 1946.     T. A. HARRIS     2,405,208
CONTROL-FORCE REDUCING DEVICE
Filed Jan. 20, 1942
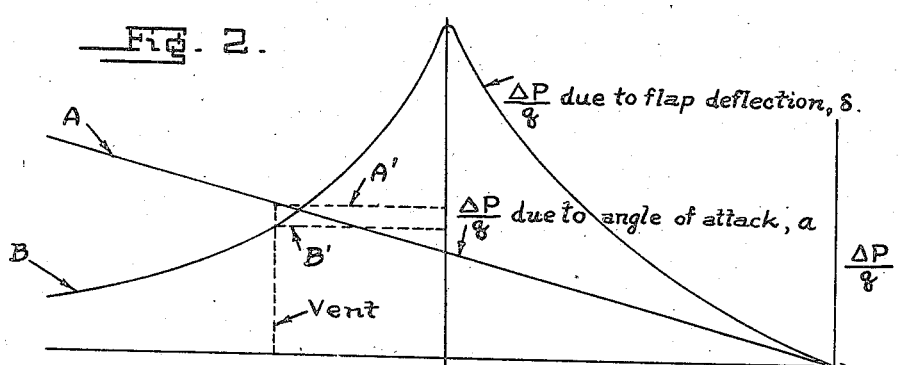
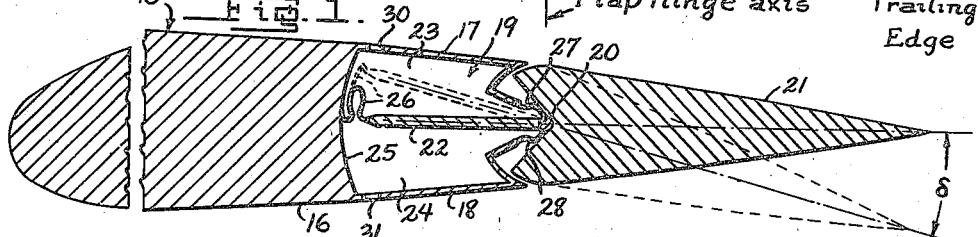
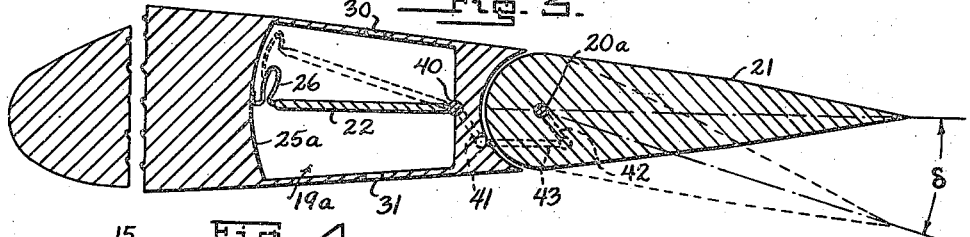
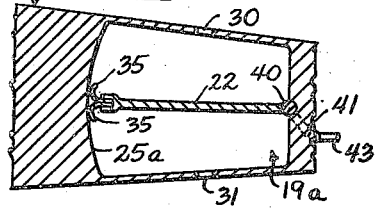
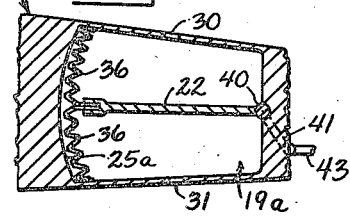
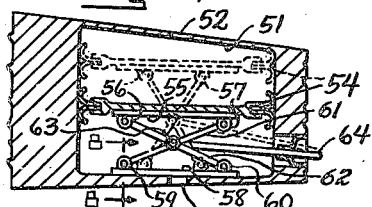
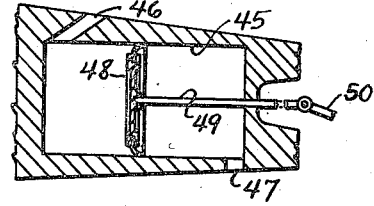
INVENTOR
T. A. Harris
BY
ATTORNEY Patented Aug. 6, 1946

2,405,208

UNITED STATES PATENT OFFICE 2,405,208

CONTROL-FORCE REDUCING DEVICE

Thomas A. Harris, Hampton, Va.

Application January 20, 1942, Serial No. 427,464

2 Claims. (Cl. 244—90)

(Granted under the act of March 3, 1883, as amended April 30, 1928; 370 O. G. 757)

The invention relates to aerodynamic balances and more particularly to improvements in control-force reducing devices of the general character shown in United States Patent 2,239,475 to Weick.

In order to reduce the force required for controlling and maneuvering airplanes, it is customary to provide some form of aerodynamic balance for the flaps commonly used for these controls.

An object of the present invention is to provide an aerodynamic balance that will decrease the control forces due to flap deflection and change in angle of attack.

Another object of the invention is the provision of means to control the magnitude of the flap hinge-moment coefficient for any conditions and to control the variation of the flap hinge-moment coefficient in accordance with the angle of attack and flap deflection.

A further object resides in the provision of means utilizing the pressure exteriorly of the airfoil and forwardly of the control flap for actuating the flap balance.

Other objects and advantages of the invention will become apparent during the course of the following detailed description, taken in connection with the accompanying drawing, forming a part of this specification, and in which drawing, Figure 1 is a fragmentary vertical cross sectional view through a typical flap and airfoil, and showing a preferred form of balance.

Figure 2 is a diagrammatic view showing a typical example of pressure distribution over the rear portion of the airfoil and the flap and flap balance.

Figures 3–7 are views similar to Figure 1 but showing modified forms of balances.

Figure 8 is a sectional detail view substantially on the line 8—8 of Figure 7.

An aerodynamic balance to achieve the desired result must decrease the control force and hence, the flap hinge moment due to deflection of the flap and due to change in angle of attack. It is understood by those skilled in the aeronautical art that the flap hinge moments are proportional to a non-dimensional hinge-moment coefficient $c_h$ and that $c_h$ is equal to $$\left(\frac{\partial c_h}{\partial \alpha}\right)\alpha + \left(\frac{\partial c_h}{\partial \delta}\right)\delta$$

where $\alpha$ = angle of attack of airfoil with relative wind
$\delta$ = flap deflection with reference to airfoil The flap parameters $$\frac{\partial c_h}{\partial \alpha} \text{ and } \frac{\partial c_h}{\partial \delta}$$

must be controlled in order to accomplish the reduction in control force and obtain control free stability. An object is to control the value of $c_h$ for any conditions and to control the variation of $c_h$ with the angle of attack and flap deflection. In order to maintain the control free stability of the airplane, the ratio $$\frac{\partial c_h}{\partial \alpha} \bigg/ \frac{\partial c_h}{\partial \delta}$$

must remain small and when the ratio is zero the control free stability is exactly the same as the control fixed stability.

Referring first to Figure 1, the numeral 15 generally designates an airfoil including a main body 16 having opposite sides 17, 18, defining a space 19 therebetween. Mounted on the main body 16, as by a shaft 20, for swinging movement about an axis transversely of the airflow, is a trailing control flap 21 provided with a rigid forward extension forming a flap-balancing partition 22 dividing the space 19 into opposite chambers 23, 24. Secured between the marginal edge of the partition 22 and the interior surface 25 of the space 19 is a flexible membrane 26 forming a seal between the chambers 23, 24. Secured between the opposite sides of the control flap 21 and the main body 16 of the airfoil are flexible membranes 27, 28 forming a seal at the juncture of the main body and the control flap, whereby to prevent the passage of fluid into or out of the chambers 23, 24 in the vicinity of the shaft 20. Extending through the opposite sides of the airfoil, at points forwardly of the juncture of the main body 16 and the control flap 21, are openings 30, 31, forming vents between the chambers and the surfaces of the airfoil, whereby pressures on the surfaces of the airfoil at the vent locations are exerted on the flap-balancing partition 22.

It is well recognized that in flight with the control flap in neutral control position carrying out the basic airfoil section, there is a difference in the air pressures along the upper and lower surfaces of the airfoil and flap, the pressure below the airfoil and flap being greater than the pressure above the airfoil and flap for a given angle of attack condition. When only the angle of attack for the airfoil is increased, that is to say, the nose of the airfoil is raised with respect to the relative wind without changing the flap deflection relative to the airfoil, there will be an increase in pressure on the lower surface of the airfoil and flap and at the same time a decrease in pressure along the upper surface of the airfoil and flap. The resultant pressures on an airfoil and flap caused by a change only in the angle of attack is represented by curve A in Figure 2. When the flap is swung downward about its axis without changing the angle of attack of the airfoil, the pressures on the lower surface of the airfoil and the flap are increased and the pressures over the upper surface of the airfoil and flap are decreased in such a manner that the resultant pressure over the airfoil and flap caused by flap deflection alone may be represented as shown by curve B in Figure 2. It will, of course, be understood without further explanation that these incremental pressures caused by angle of attack changes will be directed in the opposite direction if the angle of attack changes from zero are in the opposite direction from that indicated for curve A of Figure 2, and if the flap is deflected upward the resultant pressures caused by this deflection would be directed in the opposite direction from that shown by curve B in Figure 2 For the case where both the angle of attack and flap deflection are changed at the same time, the total resultant pressures are obtained by a summation of the resultant pressures that would be caused by change of angle of attack only and by change of flap deflection alone.

Referring again to Figure 2, the curve A' represents the increment of pressure on the flap balance due to angle of attack, and the difference in the moment of the area under curve A aft of the flap hinge axis and that under curve A', times a factor, is proportional to the hinge moment on the flap due to the angle of attack. Similarly, the curve B' represents the increment of pressure on the flap balance due to flap deflection, and the difference in the moment of the area under curve B aft of the flap hinge axis and that under curve B', times a factor, is proportional to the hinge moment on the flap due to flap deflection. By providing vents of proper size and location, i. e. within approximately 25% of the chordal distance of the wing forwardly of the hinge, and a balance of proper area, the hinge-moment coefficient and therefore the hinge moment of the flap will be of the desired value. It will be noted from an inspection of Figure 2 that the vent is disposed sufficiently forward of the flap hinge axis that the value of the curve A', representing pressure on the balance due to angle of attack, is greater than the value of the curve B', representing pressure on the balance due to flap deflection.

It will, of course, be understood that the balance 22 may be located, as shown in Figure 3, in a space 19a at any convenient place in the airfoil 15, or any other part of the airplane, and vented by openings 30, 31 at the proper place on the airfoil to provide the desired balancing action. It will also be understood that any suitable sealing means between the balance 22 and the inside 25a of the space 19a may be employed. In the example shown in Figure 4, the balance 22 carries flexible wipers 35, and in Figure 5 the accordion pleated walls 36 constitute sealing means between the balance 22 and the inside 25a of the space. In the examples shown in Figures 3–5, the balance 22 is affixed to a shaft 40, to one end of which is fastened a crank 41. Fixed to the shaft 20a of the control flap, as shown in Figure 3, is a crank 42 having its free end connected, as by a link 43, to the free end of the crank 41. The arrangements shown in Figures 3–5 permit greater amplitude of movement of the control flap than that of Figure 1.

Instead of hinging the balance, it may be mounted for reciprocable movement. In Figure 6 is shown a horizontal cylinder 45 having its opposite ends vented to the opposite sides of the airfoil as by passageways 46, 47. Reciprocably slidable in the cylinder 45 is a piston 48 provided with a piston rod 49 connected as by a link 50 to the control flap. In Figure 7 is shown an upright cylinder 51 provided with vent openings 52, 53. Reciprocably slidable in the cylinder 51 is a piston 54 provided with a guideway 55 carrying slides 56, 57. Fixedly mounted on the lower end of the cylinder is a guideway 58 carrying slides 59, 60. Extending between the slides 56, 60 and the slides 57, 59 are links 61, 62, pivotally joined intermediate their ends by a pin 63, which may be operatively connected, as by an arm 64, to the control flap.

In the operation of the improved aerodynamic balances, the air pressures on opposite sides of the airfoil in the vicinity of the vents, are transmitted to the chambers at opposite sides of the flap balance in a manner whereby to decrease the control force due to deflection of the flap and change in angle attack.

By controlling the location of the vent openings, it is possible to make the parameter $$\frac{\partial c_h}{\partial \alpha}$$

equal to zero which will make the control free stability equal to the control fixed stability.

The invention described herein may be manufactured and/or used by or for the Government of the United States of America for governmental purposes without the payment of any royalties thereon or therefor.

Various changes may be made in the forms of invention herein shown and described without departing from the spirit of the invention or the scope of the following claims.

What is claimed is:

1. An airfoil including a main body, a trailing control flap mounted for swinging movement relative to the main body and about an axis substantially transversely of the direction of airflow, said main body including a space between its outer surfaces forwardly of said axis, a movable partition dividing said space into chambers adjacent to each of said outer surfaces, said partition and control flap being connected for movement of either one responsive to movement of the other, and vent passageways in said outer surfaces connecting said chambers with the corresponding exterior sides of the airfoil respectively at zones within 25% of the chordal distance forwardly of the juncture of said trailing control flap with the main body of said airfoil.

2. An airfoil including a main body, a trailing control flap mounted for swinging movement relative to the main body and about an axis substantially transversely of the direction of airflow, said main body including upper and lower walls defining a space within the main body surfaces forwardly of said axis, a movable partition dividing said space into upper and lower chambers, said partition and control flap being connected for movement of either one responsive to movement of the other, and vent pasageways in said upper and lower walls connecting said upper and lower chambers with the corresponding exterior sides of the airfoil respectively at zones within approximately 25% of the chordal distance of the wing forwardly of the juncture of said trailing control flap with the main body of said airfoil.

THOMAS A. HARRIS.